H. T. ROBBINS.
Improvement in Lamp-Wicks.
No. 115,524. Patented May 30, 1871.
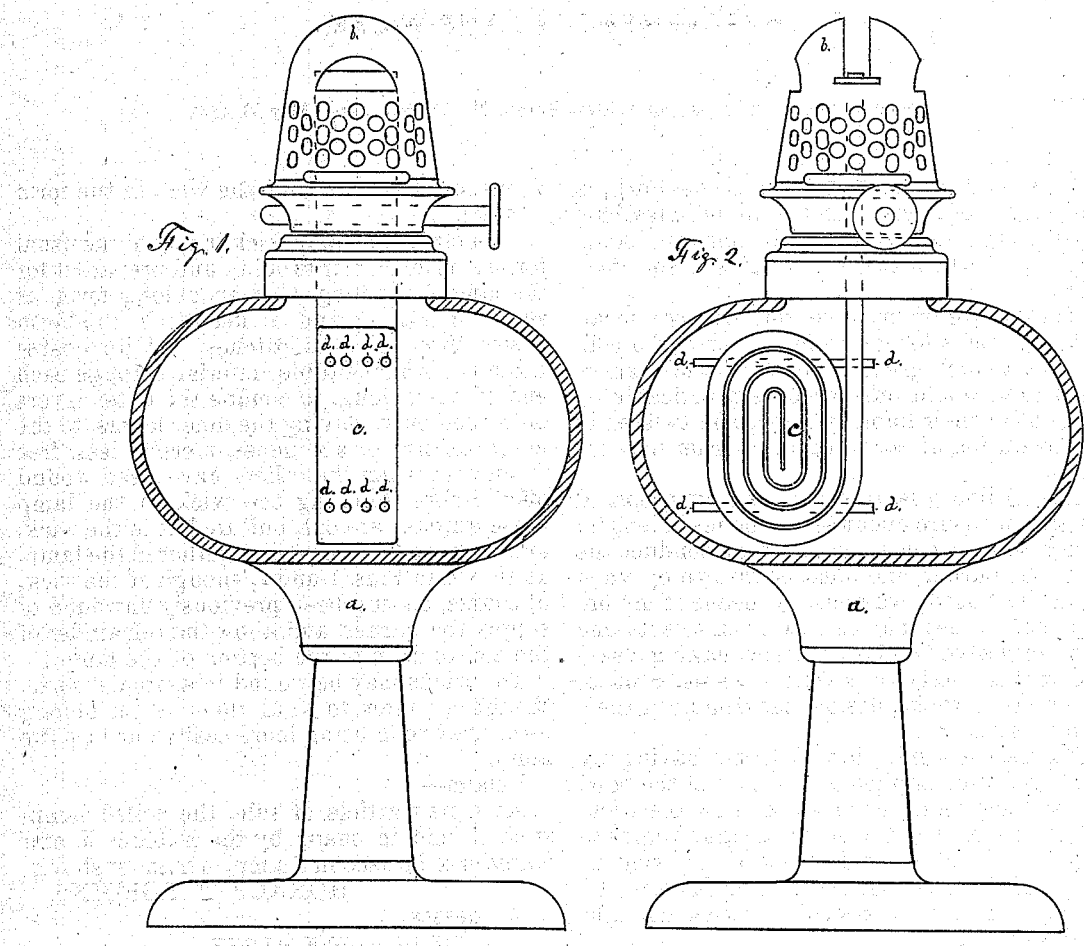
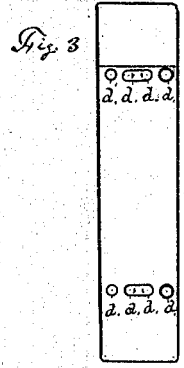
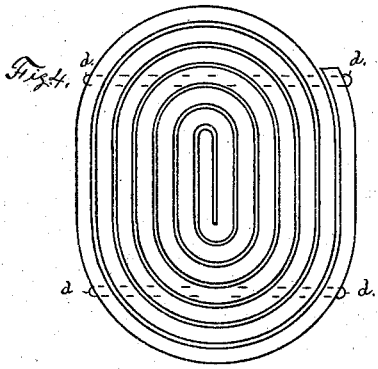
Witnesses.
A. E. Robbins.
H. P. Robbins.
Inventor
Horace T. Robbins.

UNITED STATES PATENT OFFICE.

HORACE T. ROBBINS, OF HYDE PARK, MASSACHUSETTS.

IMPROVEMENT IN LAMP-WICKS.

Specification forming part of Letters Patent No. 115,524, dated May 30, 1871.

I, HORACE T. ROBBINS, of Hyde Park, in the county of Norfolk and State of Massachusetts, have invented an Improvement in Lamp-Wicks, of which the following is a specification:

The nature of my invention consists in arranging wicks for lamps in the form of a coil, so that a much greater length of wick can be used than would otherwise be practicable on account of their liability to become twisted in the operation of screwing the burner into the lamp.

The ordinary lamp-wicks, as now prepared for sale, measure about seven inches in length, which soon become too short to conduct the oil to the burner, and must be thrown by when about half used; whereas, by means of my improvement, they may be used from twenty-one to twenty-seven inches, thereby making a saving of from sixty to seventy-five per cent. of the waste of wicks, besides the trouble of their frequent renewal.

Figure 1 is a side view of a lamp having my improved wick applied to it, a part of the bowl of the lamp being removed to show the wick. Fig. 2 is a view of the same at right angles to Fig. 1. Fig. 3 is a side view of the wick as prepared for sale, before being applied to the lamp. Fig. 4 is a view of the wick at right angles to Fig. 3.

$a$ is the lamp; $b$, the burner; $c$, the wick; $d$, the stitches that hold the wick in the form of a coil.

I construct my lamp-wick in any of the usual forms, either flat or tubular, and prepare it for the lamp by coiling it in an oblong form, as shown in Fig. 4; and to keep it in this form I sew three or four stitches, $d$, with coarse thread or other suitable material, through each end of the oblong, to confine the outer layers of the coil only, leaving the inner layers, to the length of five or six inches, more or less, free to unwind when the others have been wound off. Before applying the wick to the lamp these stitches are cut, but are left in the wick, and serve to hold the coil together in the lamp, as shown in Figs. 1 and 2, enough of the wick, of course, having been previously unwound to supply the burner, and allow the remainder of the coil to drop to the bottom of the lamp.

The wicks may be wound in a circular form, though I prefer to wind them in an oblong form, they thus being more easily put into the lamp.

I claim—

As a new article of sale, the coiled lamp-wick $c$, held in shape by the stitches $d$, and adapted to be used in a lamp, in manner shown.

HORACE T. ROBBINS.

Witnesses:
  EDWIN ALDEN ALGER,
  CHARLES T. CRANE.